April 6, 1943.  L. M. TICHVINSKY ET AL  2,315,674
BEARING
Filed Oct. 26, 1940  2 Sheets-Sheet 1

WITNESSES:
C. J. Weller.
F. C. Lyle

INVENTORS
Leonid M. Tichvinsky
and René A. Baudry.
BY O. B. Buchanan
ATTORNEY

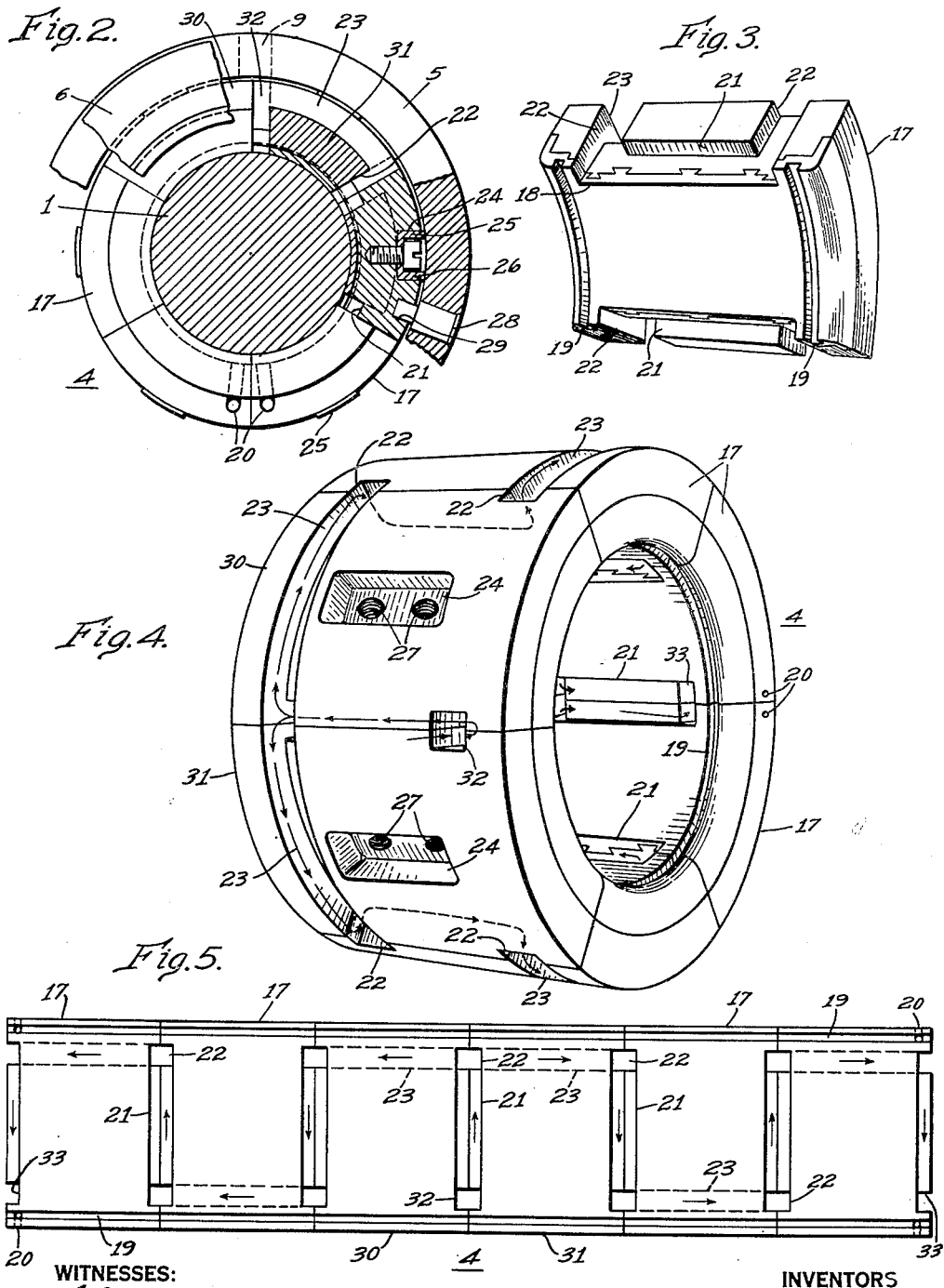

Patented Apr. 6, 1943

2,315,674

UNITED STATES PATENT OFFICE 2,315,674

BEARING

Leonid M. Tichvinsky, Annapolis, Md., and René A. Baudry, Pittsburgh, Pa., assignors to Westinghouse Electric & Manufacturing Company, East Pittsburgh, Pa., a corporation of Pennsylvania Application October 26, 1940, Serial No. 362,966

7 Claims. (Cl. 308—76)

The present invention relates to bearings, and more particularly to a shoe-type bearing which is particularly adapted for use on large, high-speed machines.

In large machines rotating at high speeds and especially in those which operate at relatively high temperatures, such as steam turbines, the bearings tend to become quite hot, and the problem of adequately cooling and lubricating the bearings is very difficult. In some cases, such as marine turbines, it is necessary to cool the bearing after the machine is shut down, and this has had to be done by running the turbine at light load with very low steam temperature, so that the heat of the bearing could be dissipated through the lubricating oil. Similar problems are encountered in other large machines operating at high speeds, such as dynamo-electric machines, in which the bearings tend to become hot, and special attention must be given to cooling them as well as to proper lubrication.

The principal object of the present invention is to provide a bearing which is especially adapted for use in large, high-speed machines, such as dynamo-electric machines and turbines, in which very effective cooling of the bearing and very efficient lubrication are obtained.

A more specific object of the invention is to provide a shoe-type bearing using flooded lubrication, in which a continuous flow of lubricant is maintained through the bearing, and in which the lubricant is circulated through the bearing in a novel manner to obtain the most effective cooling and lubrication.

Another object of the invention is to provide a bearing for large, high-speed machines which can be assembled and disassembled much more easily and in materially less time than the conventional types of bearings.

A further object of the invention is to provide a bearing for large, high-speed machines which can be made of considerably smaller dimensions than the conventional types of bearings because of its very effective cooling. This results in a more compact construction and a material saving of space, which are important considerations in the case of machines of large size.

Other objects and advantages of the invention will be apparent from the following detailed description, taken in connection with the accompanying drawings, in which:

Fig. 2 is an end elevation, partly in section and with parts broken away, showing the bearing of the present invention;

Fig. 3 is a perspective view of a single bearing shoe;

Fig. 4 is a perspective view of the completely assembled bearing; and

Fig. 5 is a development of the internal bearing surface of the bearing.

Figure 1:
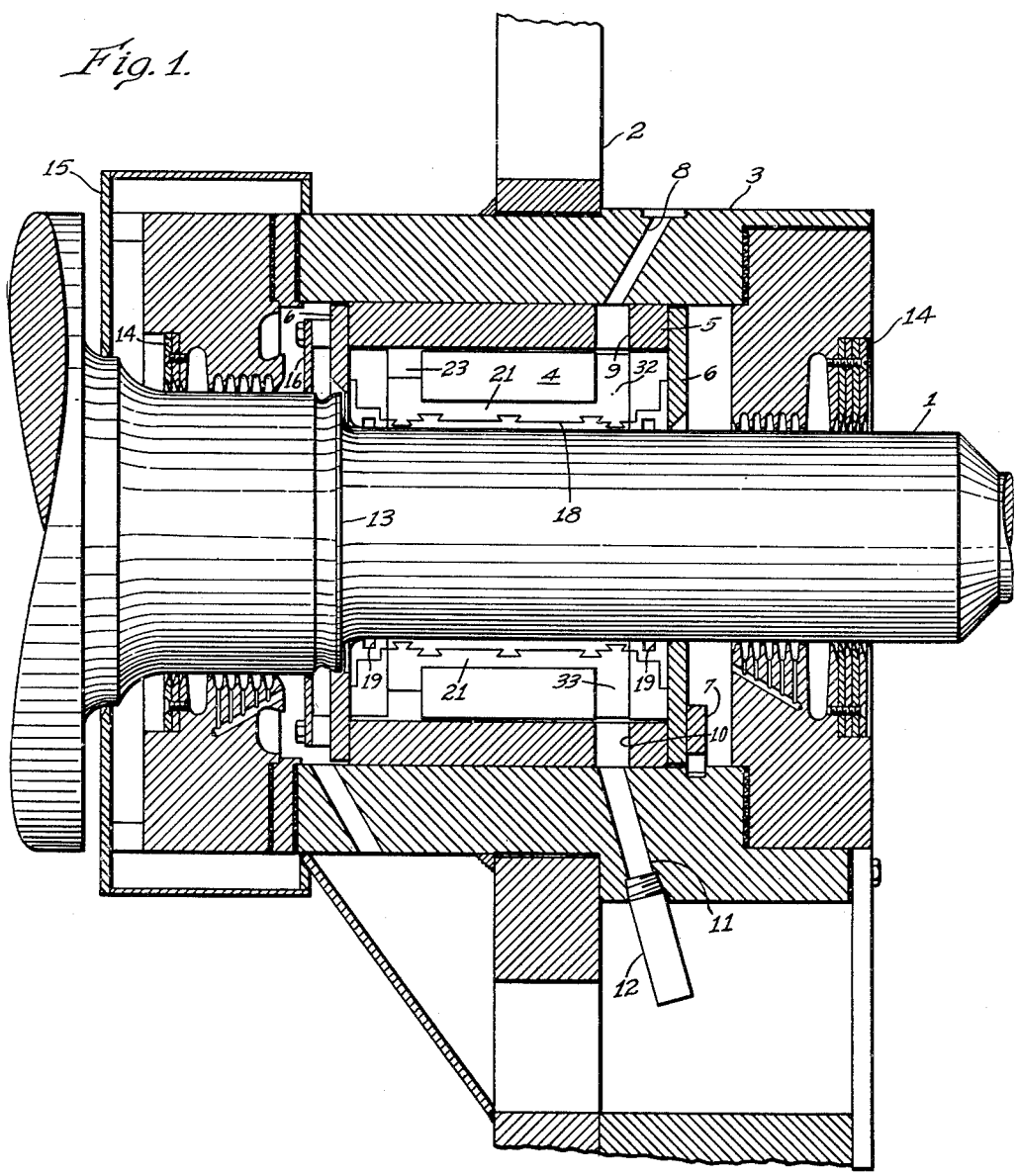
Figure 1 is a longitudinal sectional view of a typical bearing assembly in which the bearing of the present invention may be used.

Fig. 1 shows a typical bearing assembly which embodies the novel bearing of the present invention and which is suitable for use in a large dynamo-electric machine, or other type of large, high-speed machine. The machine itself is not shown but it has a shaft 1 and a frame, indicated at 2, in which a bearing housing 3 is mounted. The frame 2 and bearing housing 3 may be of any construction which is suitable for the particular type of machine involved, and they have not been illustrated in detail since their exact construction is immaterial to the present invention. The bearing 4, which forms the subject-matter of the invention, is contained in a cylindrical steel retainer 5, and is held in position therein by annular retainer plates 6 secured to each end of the retainer 5. The retainer 5 is held in a stationary position in the bore of the bearing housing 3 by a suitable lock plate 7.

An oil duct 8 is provided at the top of the bearing housing 3 and communicates with an oil inlet 9 in the retainer 5. The oil duct 8 is adapted to be connected to a suitable external oil supply system, and during operation of the machine, a continuous flow of lubricating oil is maintained through this duct and the oil inlet 9, from which it flows through the bearing in a manner to be described hereinafter, and is discharged through an oil outlet 10 in the lower part of the retainer 5 and an oil duct 11 in the bottom of the bearing housing 3, from which it may pass into a drain pipe 12 to be returned to the external oil system. The shaft 1 has an oil slinger 13 formed on it to throw off the excess oil which flows from the bearing along the shaft, in order to prevent it from getting into the machine, and bearing seals 14 of any suitable or usual type are provided at each end of the bearing housing 3 to prevent the escape of any oil which may reach them and to prevent the entrance of dust or dirt into the bearing. Baffle plates 15 and 16 are preferably also provided on the side of the bearing towards the machine to prevent the escape of oil vapors which might get into the machine, where their presence would be injurious to the windings.

The bearing 4 is shown in detail in Figs. 2 to 5, and consists of a plurality of segmental bearing shoes 17. The bearing shown in the drawings for the purpose of illustration has six of these shoes, although it is to be understood that any suitable number could be employed. Each of the bearing shoes, as shown more particularly in Fig. 3, has inner and outer cylindrical surfaces and substantially radial side surfaces, so that the shoes can be assembled into a complete cylindrical bearing. The inner cylindrical surface of each shoe has a liner 18 of babbitt, or other suitable bearing metal, to provide a bearing surface for the shaft. An oil groove 19 is cut in the bearing surface adjacent each end of each bearing shoe to catch the oil flowing along the shaft and prevent its escape from the bearing. Drain holes 20 are drilled in the two lowermost shoes of the bearing and communicate with the grooves 19 to permit the oil caught by the grooves to drain away and be returned to the oiling system of the machine. Each bearing shoe 17 also has longitudinal grooves 21 cut in the inner bearing surface at each edge thereof, as clearly shown in Fig. 3. These grooves extend for almost the complete length of the shoe and terminate just short of the oil grooves 19. Radial grooves 22 are cut in each radial side surface of the bearing shoes 17 and extend from the ends of the longitudinal grooves 21 to the outer surface of the bearing shoe. A circumferential grooves 23 is cut in the outer cylindrical surface of each bearing shoe at one end of the shoe and connects the two radial grooves 22 at that end, as clearly shown in Figs. 3 and 4. A recess 24 is preferably also provided in the outer surface of each bearing shoe 17, and a hardened steel block 25 is secured in each of the recesses 24 by means of screws 26. The purpose of these blocks is to bear against the retainer 5 and thus prevent wear of the outer surfaces of the bearing shoes. By using the blocks 25, the necessity of hardening the entire outer surfaces of the shoes to prevent excessive wear is avoided.

The bearing shoes 17 are assembled in the retainer 5 to form a cylindrical bearing for the shaft, and a dowel pin 28 is secured in the retainer and engages in a groove 29 formed in the outer surface of one of the shoes 17 to prevent rotation of the bearing in the retainer. In assembling the bearing, two of the bearing shoes, designated 30 and 31, are arranged, as shown in Fig. 4, with the circumferential grooves 23 in their outer surfaces adjoining at one end of the bearing so that the radial grooves 22 at the opposite ends of these two shoes cooperate to form a radial inlet for the oil, which is indicated at 32. The shoes 30 and 31 are positioned so that the inlet 32 is opposite the oil inlet 9 of the retainer 5. The remaining bearing shoes 17 are assembled with their circumferential grooves 23 alternately at opposite ends of the bearing, as clearly shown in Figs. 4 and 5. Since an even number of bearing shoes is used in this embodiment of the invention, the two shoes which are opposite to the bearing shoes 30 and 31 will also have their circumferential grooves 23 adjoining, and the radial grooves 22 at the opposite ends of these shoes will cooperate to form a radial oil outlet, indicated at 33. The retainer 5 is designed so that the oil outlet 10 is opposite the oil outlet 33, so that the oil flowing through the bearing is discharged through this opening.

This bearing is intended for flooded lubrication and when the machine is operating, a continuous supply of lubricant is fed to the bearing through the duct 8, and flows through the oil inlet 9 in the retainer 5 into the inlet 32 formed between the bearing shoes 30 and 31. The oil flowing into the bearing in this way flows longitudinally through the longitudinal grooves 21 of the bearing shoes 30 and 31, and then into their circumferential grooves 23 where it divides, and flows in opposite directions through the grooves 23 and then in a zigzag path through the successive longitudinal and circumferential grooves, as shown by the arrows in Figs. 4 and 5, to the opposite side of the bearing where it escapes through the oil outlet 33 into the outlet opening 10 and discharge duct 11. A copious supply of oil is maintained and the oil flowing through the longitudinal grooves is carried into the bearing clearance between the bearing and the shaft to provide the necessary oil film. The oil flowing along the shaft in this way is caught in the oil grooves 19 at each end of the bearing and is drained off through the openings 20 and returned to the external oil system. Any oil which gets past the grooves 19 is removed from the shaft by the oil slinger 13 or by the seals 14.

It should now be apparent that a bearing has been provided which is particularly suitable for large, high-speed machines, and in which very effective lubrication and cooling of the bearing are provided. Because of the novel circulation of the oil longitudinally at a plurality of places on the inside surface of the bearing, where it is fed to the clearance between the bearing and the shaft, as well as circumferentially on the outside of the bearing, the lubricant is distributed uniformly to all parts of the bearing, and very effective cooling of the bearing as well as good lubrication are obtained. It will also be noted that the bearing is of relatively simple construction and, therefore, can be assembled or disassembled very easily and rapidly. Because of the effective cooling of the bearing, it is possible to make it of considerably smaller dimensions than would be required for a bearing of any of the conventional types, and thus the construction can be made more compact, which is an important consideration in the case of large machines.

A preferred embodiment of the invention has been shown and described for the purpose of illustration, but it is to be understood that the invention is not limited to the exact arrangement shown, but is capable of various modifications. Thus, any suitable number of bearing shoes may be used, although an even number should preferably be employed, and the details of construction of the shoes and of the bearing assembly can be modified in any desired way to fit the needs of a particular application. It is to be understood, therefore, that the invention is not restricted to the particular details of construction shown and described, but in its broadest aspects it includes all equivalent embodiments and modifications which come within the scope of the appended claims.

We claim as our invention:

1. A bearing for a rotatable shaft comprising a plurality of segmental bearing shoes having bearing surfaces on their inner faces, each of said bearing shoes having a longitudinal groove in its bearing surface at each side thereof extending substantially from end to end of the bearing surface, and having a circumferential groove in its outer surface near one end thereof, the circumferential groove connecting the longitudinal grooves for the flow of lubricating oil therethrough, and at least some of said bearing shoes being assembled with the circumferential grooves of adjacent bearing shoes at opposite ends of the bearing, whereby oil fed into a longitudinal groove at one side of the bearing at a point distant from the circumferential grooves flows through the longitudinal and circumferential grooves in series to the other side of the bearing.

2. A cylindrical bearing for a rotatable shaft, said bearing having a plurality of longitudinal grooves in its internal bearing surface for the flow of lubricating oil, said grooves extending substantially from end to end of the bearing surface, and circumferential grooves in its external surface connecting the longitudinal grooves, the circumferential grooves being disposed alternately at opposite ends of the longitudinal grooves at least part way around the bearing so that oil fed into a longitudinal groove at one side of the bearing flows through the longitudinal and circumferential grooves in series in a zigzag path to the opposite side of the bearing.

3. A cylindrical bearing for a rotatable shaft, said bearing having a plurality of longitudinal grooves in its internal bearing surface for the flow of lubricating oil and circumferential grooves in its external surface connecting the longitudinal grooves, an oil inlet for feeding oil into one of said longitudinal grooves from which circumferential grooves extend in both directions, successive longitudinal and circumferential grooves being arranged with the circumferential grooves disposed alternately at opposite ends of the longitudinal grooves, so that the oil flows through them in series in a zigzag path, and an oil outlet in a longitudinal groove diametrically opposite to said first mentioned longitudinal groove.

4. A bearing for a rotatable shaft comprising a plurality of segmental bearing shoes assembled to form a cylindrical bearing, each of said bearing shoes having a circumferential groove in its external surface adjacent one end thereof and having longitudinal grooves in its internal bearing surface, said longitudinal grooves extending substantially from end to end of the bearing surface and communicating at one end with the circumferential groove, and said bearing shoes being assembled with the longitudinal grooves of adjacent bearing shoes communicating directly with each other and with the circumferential grooves of at least some adjacent bearing shoes disposed at opposite ends of the bearing.

5. A bearing comprising a plurality of segmental bearing shoes having cylindrical inner and outer surfaces and radial side surfaces, each of said bearing shoes having a longitudinal groove in its inner surface along each side thereof, a radial groove at each end of each side surface extending from the longitudinal groove to the outer surface, and a circumferential groove in its outer surface at one end thereof extending between the radial grooves at that end, said bearing shoes being assembled to form a cylindrical bearing with the circumferential grooves of the shoes of each half of the bearing alternately at opposite ends of the bearing.

6. A bearing comprising a plurality of segmental bearing shoes having cylindrical inner and outer surfaces and radial side surfaces, each of said bearing shoes having a longitudinal groove in its inner surface along each side thereof, a radial groove at each end of each side surface extending from the longitudinal groove to the outer surface, and a circumferential groove in its outer surface at one end thereof extending between the radial grooves at that end, said bearing shoes being assembled to form a cylindrical bearing with two adjacent shoes having their circumferential grooves adjoining at the same end of the bearing and their radial grooves at the other end cooperating to provide an inlet for lubricating oil, the remaining shoes having their circumferential grooves alternately at opposite ends of the bearing whereby oil flowing through the longitudinal and circumferential grooves in series follows a zigzag path at least part-way around the bearing.

7. A bearing for a rotatable shaft comprising a plurality of segmental bearing shoes having bearing surfaces on their inner faces, said bearing shoes having longitudinal grooves in their bearing surfaces for the flow of lubricating oil, said grooves extending substantially from end to end of the bearing surfaces, said bearing shoes also having circumferential grooves on their outer surfaces connecting the longitudinal grooves, said circumferential grooves being disposed alternately at opposite ends of the longitudinal grooves, and means for feeding oil into one of said longitudinal grooves at a point distant from the circumferential grooves, whereby the oil flows through said longitudinal and circumferential grooves in series and in opposite directions in adjacent longitudinal grooves.

LEONID M. TICHVINSKY.
RENÉ A. BAUDRY.